United States Patent [19]

Helfritch et al.

[11] 4,357,151

[45] Nov. 2, 1982

[54] ELECTROSTATICALLY AUGMENTED CARTRIDGE TYPE DUST COLLECTOR AND METHOD

[75] Inventors: Dennis J. Helfritch; Edward J. Gonas, both of Charlotte, N.C.

[73] Assignee: American Precision Industries Inc., Buffalo, N.Y.

[21] Appl. No.: 238,081

[22] Filed: Feb. 25, 1981

[51] Int. Cl.$^3$ .......................... B03C 3/80; B01D 46/04

[52] U.S. Cl. .......................... 55/6; 55/12; 55/96; 55/117; 55/124; 55/132; 55/137; 55/155; 55/302; 55/480; 55/498; 55/508

[58] Field of Search .................. 55/6, 12, 96, 97, 117, 55/120, 124, 131, 132, 137, 152, 155, 273, 284, 302, 350, 480, 491, 492, 498, 503, 505, 508

[56] References Cited

U.S. PATENT DOCUMENTS

| | | | |
|---|---|---|---|
| 2,398,824 | 4/1946 | Fisk et al. | 55/480 |
| 3,078,646 | 2/1963 | Leech et al. | 55/96 |
| 3,332,217 | 7/1967 | Rymer | 55/350 |
| 3,421,291 | 1/1969 | Messen-Jaschin | 55/131 |
| 3,668,835 | 6/1972 | Vicard | 55/107 |
| 3,706,182 | 12/1972 | Sargent | 55/124 |
| 3,733,784 | 5/1973 | Anderson et al. | 55/117 |
| 3,798,878 | 3/1974 | Pausch | 55/96 |
| 3,819,985 | 6/1974 | Dusevoir | 317/3 |
| 3,839,185 | 10/1974 | Vicard | 204/307 |
| 3,910,779 | 10/1975 | Penney | 55/124 |
| 3,915,676 | 10/1975 | Reed et al. | 55/112 |
| 3,930,815 | 1/1976 | Masuda | 55/123 |
| 4,147,522 | 4/1979 | Gonas et al. | 55/6 |
| 4,171,963 | 10/1979 | Schuler | 55/302 |
| 4,174,204 | 11/1979 | Chase | 55/302 |
| 4,209,310 | 6/1980 | Berkhoel | 55/284 |
| 4,231,770 | 11/1980 | Johnson, Jr. | 55/302 |
| 4,277,258 | 7/1981 | Bojsen | 55/152 |
| 4,278,454 | 7/1981 | Nemesi | 55/492 |
| 4,297,115 | 10/1981 | Johnson, Jr. | 55/302 |

FOREIGN PATENT DOCUMENTS

| | | | |
|---|---|---|---|
| 973709 | 2/1951 | France | 55/480 |
| 55-47115 | 4/1980 | Japan | 55/302 |

*Primary Examiner*—David L. Lacey
*Attorney, Agent, or Firm*—Christel, Bean & Linihan

[57] ABSTRACT

A method and apparatus for separating particulate matter from a gas stream wherein dirty gas is moved first through a corona discharge zone, such as that provided by a plurality of rod-like electrodes each having a sharp-edged corona producing ribbon-like formation extending axially therealong, and then is moved through a plurality of mechanical filters of the cartridge type, each comprising a perforated, cylindrical, metal outer shell and an inner filter medium of foraminous dielectric material such as pleated paper. Each cartridge is closed at one end and open at the other from which cleaned gas flows out axially. The electrodes are located circumferentially of the filters with the filter and electrode longitudinal axes being substantially parallel. The conductive outer shells of the filter elements are connected to an electrical reference such as ground and the electrodes are connected to a relatively high electrical potential in a manner generating corona discharge between the electrode formations and the filter element shells. Collected particulate material in the filter media and on the shells is removed by introducing a controlled quantity of high pressure gas at predetermined times and at a location to induce a substantial flow of gas through the apparatus in a reverse direction.

35 Claims, 4 Drawing Figures

ELECTROSTATICALLY AUGMENTED CARTRIDGE TYPE DUST COLLECTOR AND METHOD

BACKGROUND OF THE INVENTION

This invention relates to the art of dust collection, and more particularly to a new and improved method and apparatus of the electrostatic type for separating particulate matter from a gas stream.

Dust collection methods and apparatus of the mechanical filtration type which employ a porous filter medium, for example cartridges comprising an outer perforated shell and an inner filter medium such as paper, provide a very efficient collection of small particles. It would be highly desirable to provide such method and apparatus having even greater particle collection efficiency with lower pressure drop and in an arrangement which occupies a relatively small volume of space. In this connection, dust collection methods and apparatus of the electrostatic type are known to have various advantages such as high collection efficiency and operation at relatively lower pressure drop. In addition, another important consideration is cleaning or otherwise removing collected dust from surfaces of such apparatus.

SUMMARY OF THE INVENTION

It is, therefore, an object of this invention to provide a new and improved method and apparatus for collecting dust which advantageously combines various desirable features of the electrostatic and mechanical filtration types.

It is a further object of this invention to provide such method and apparatus providing increased collection efficiency with operation at relatively lower pressure drop.

It is a further object of this invention to provide such method and apparatus which can be performed and constructed in a relatively small space.

It is a further object of this invention to provide such method and apparatus having the additional capability for cleaning collected dust from surfaces of the apparatus.

The present invention provides a method and apparatus for separating particulate matter from a gas stream wherein dirty gas is moved first through a corona discharge zone, such as that provided by a plurality of elongated electrodes each having a sharp-edged corona producing formation extending axially therealong, and then is moved through a plurality of mechanical filters of the type comprising an outer perforated hollow shell of conductive material and an inner filter medium of foraminous dielectric material. Cleaned gas exits axially from each of the filters, which are in the form of cartridges open at one end. The electrodes are located circumferentially of the filters with the filter and electrode longitudinal axes being substantially parallel. The conductive outer shells of the filter elements are connected to an electrical reference such as ground and the electrodes are connected to a relatively high electrical potential in a manner generating corona discharge between the electrode formations and filter element shells. Collected particulate material in the filter media and on the shells is removed by introducing a controlled quantity of high pressure gas at predetermined times and at a location to induce a substantial flow of gas through the apparatus in a reverse direction.

The foregoing and additional advantages and characterizing features of the present invention will become clearly apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENT

In basic apparatus of the cartridge filter type for separating particulate matter from a gas stream, a plurality of cartridge filter elements each comprising an outer perforated metal shell and an inner filter medium such as paper are located between the dirty gas inlet and clean gas outlet of the apparatus. Gas to be cleaned passed from the apparatus inlet through the outer shells and then through the filter media and axially out the single open ends of the filter elements whereupon clean gas exits through the apparatus outlet. Cleaning deposited particulates off the filter elements is accomplished by pulsing high pressure gas into the filter elements in a reverse direction first through the filter media and then through the outer shells to dislodge collected particulate matter which ultimately is removed from the apparatus in a suitable manner. In accordance with this invention there is provided a plurality of electrodes each having a sharp edge formation which electrodes are positioned relative to the filter elements to provide a corona discharge between the electrode formations and the corresponding outer shells of the filter elements. A zone of corona discharge is thus provided between the dirty gas inlet and the filter elements in a manner such that gas and particulate matter must flow through the zone prior to passing through the filters. The electrodes are elongated, located between the filter elements and disposed with the electrode longitudinal axes parallel to the filter element longitudinal axes which, in turn, are substantially mutually parallel. Each electrode is in the form of a rod having a sharp-edged, foil-like element attached to and running along the rod outer surface, preferably in a spiral formation. The outer shells of the filter elements are connected to a reference potential or ground, and a relatively high voltage is applied to the electrodes. Providing the zone of corona discharge advantageously results in greater particle collection efficiency and lower pressure drop in the apparatus, and the foregoing desirably can be provided in an arrangement which occupies a relatively small volume of space.

In accordance with this invention there is also provided flow directing means in each of the filter elements in the form of a hollow directing element impervious to gas flow having one end adjacent an open end of the filter element and an opposite end within the filter. There is also provided cleaning means in the form of a source of compressed gas and conduits leading from the source having outlets located adjacent the hollow directing elements for introducing a controlled quantity of high pressure gas at selected times adjacent the hollow directing elements and in a direction into the filter elements to remove collected particulate matter from the filter elements.

Figures 1, 4:
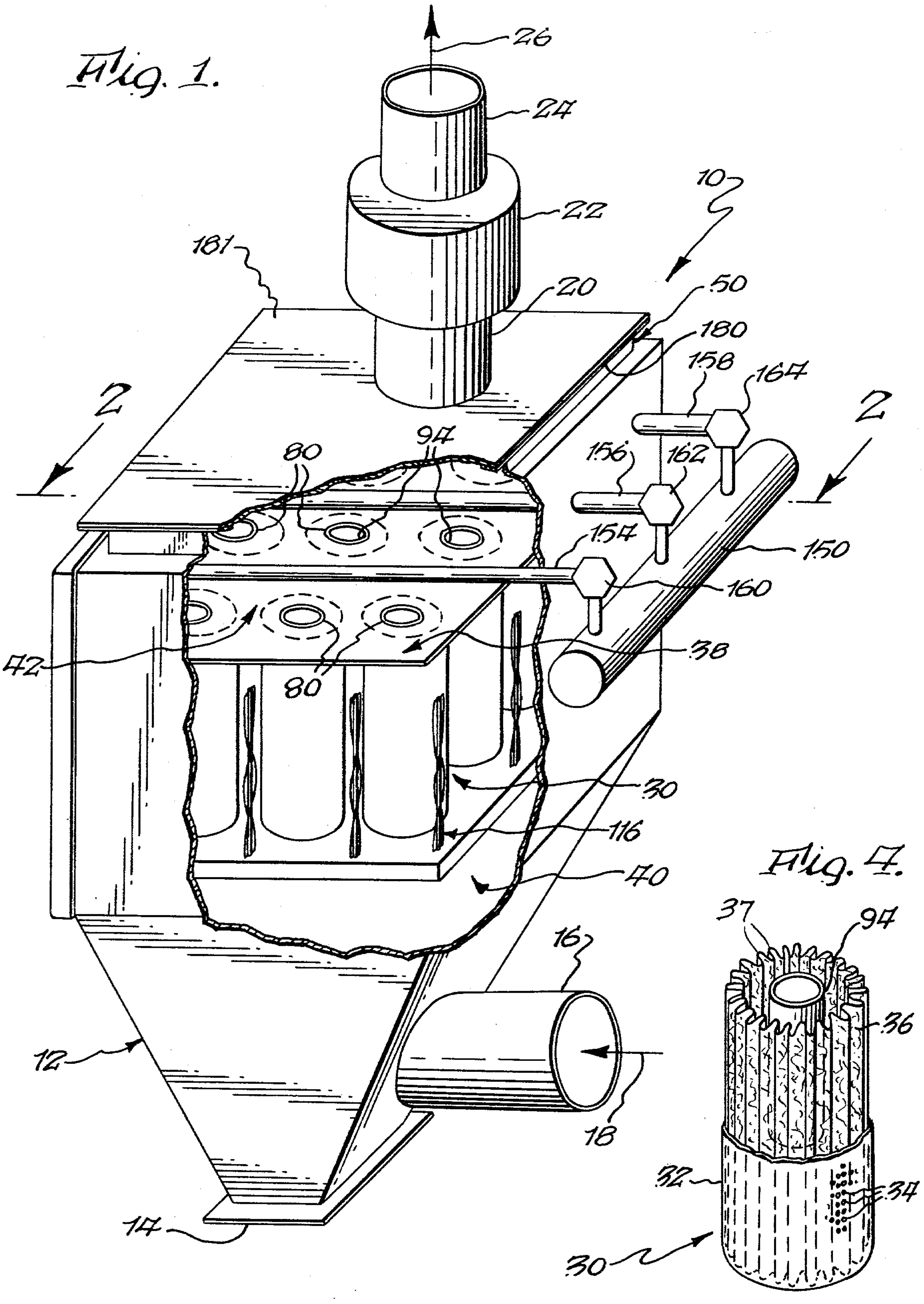
FIG. 1 is a perspective view, with parts removed, of an installation of apparatus according to the present invention.
FIG. 4 is a fragmentary perspective view illustrating in further detail one of the filter elements of the apparatus of FIGS. 1–3.

Referring now to FIG. 1, the apparatus according to the present invention for separating particulate matter from a gas stream includes a housing having a main portion generally designated 10, which preferably is hollow rectangular in shape, and a hopper portion generally designated 12 which is defined by inwardly tapering sidewalls leading from the lower end of housing portion 10 to an outlet 14. The main portion 10 and hopper portion 12 are in fluid communication, and the interior of main portion 10 is separated into two regions by a wall or tube sheet which will be shown in further detail presently. One of these two interior regions is designated the dirty gas region and is in fluid communication with a housing inlet for receiving dirty gas from a duct 16. Dirty gas flows into the apparatus along duct 16 in the direction of arrow 18 whereupon it enters the hopper portion 12 and flows upwardly as viewed in FIG. 1 into the housing main body portion 10 in a manner which will be described. The apparatus also includes an outlet conduit 20 connected to the other interior region of housing portion 10 which is designated the clean gas region. Thus, cleaned gas leaves the apparatus through outlet conduit 20. Gas is moved through the apparatus from the inlet connected to duct 16 to the outlet connected to conduit 20 by a motor driven fan 22 which preferably is connected to the outlet duct 20 in a known manner. The output of the fan is connected to a duct 24 through which the cleaned gas is conveyed in a direction indicated by the arrow 26.

Figure 2:
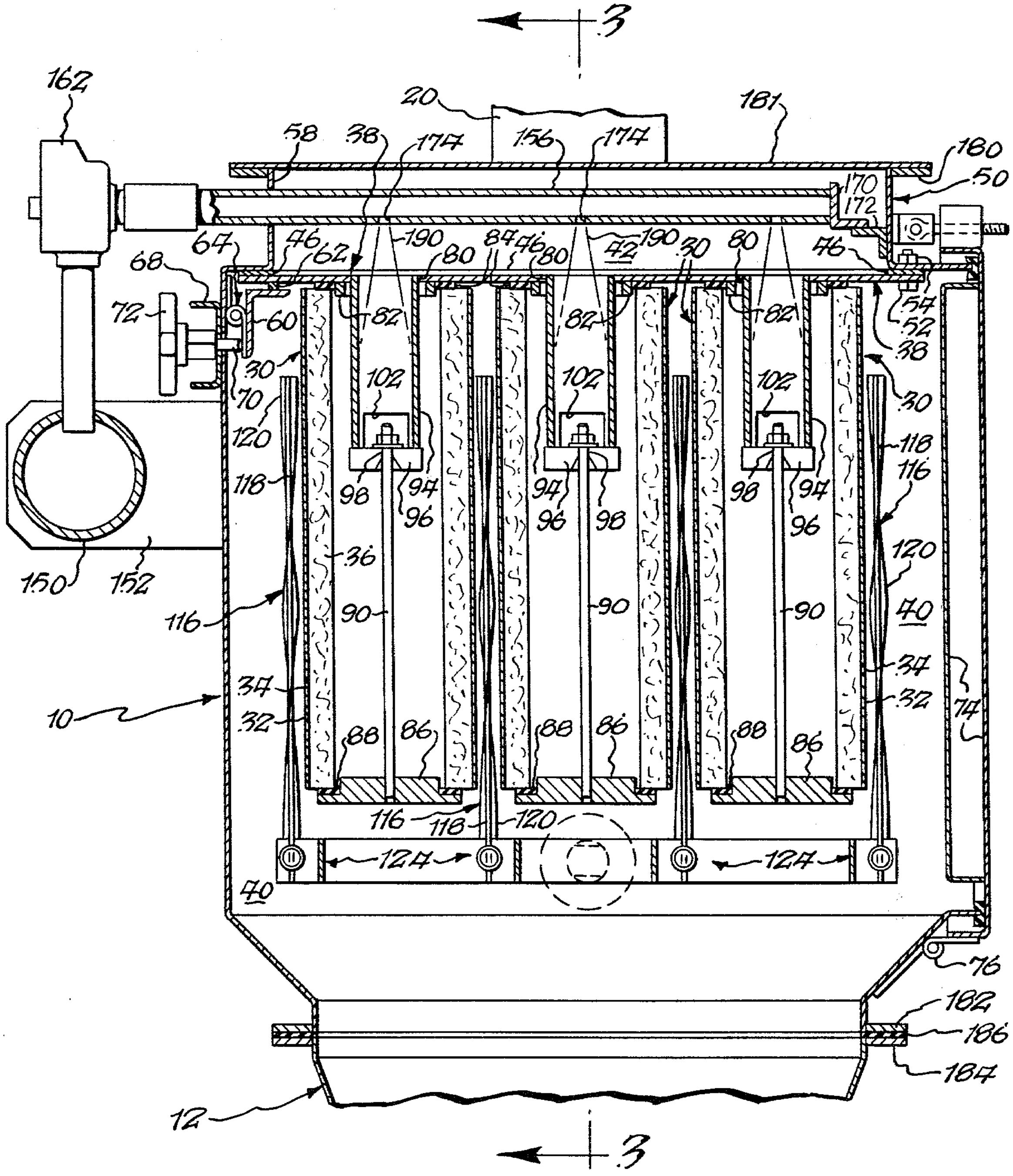
FIG. 2 is a sectional view of the apparatus of FIG. 1 taken about on line 2—2 of FIG. 3.
Figure 3:
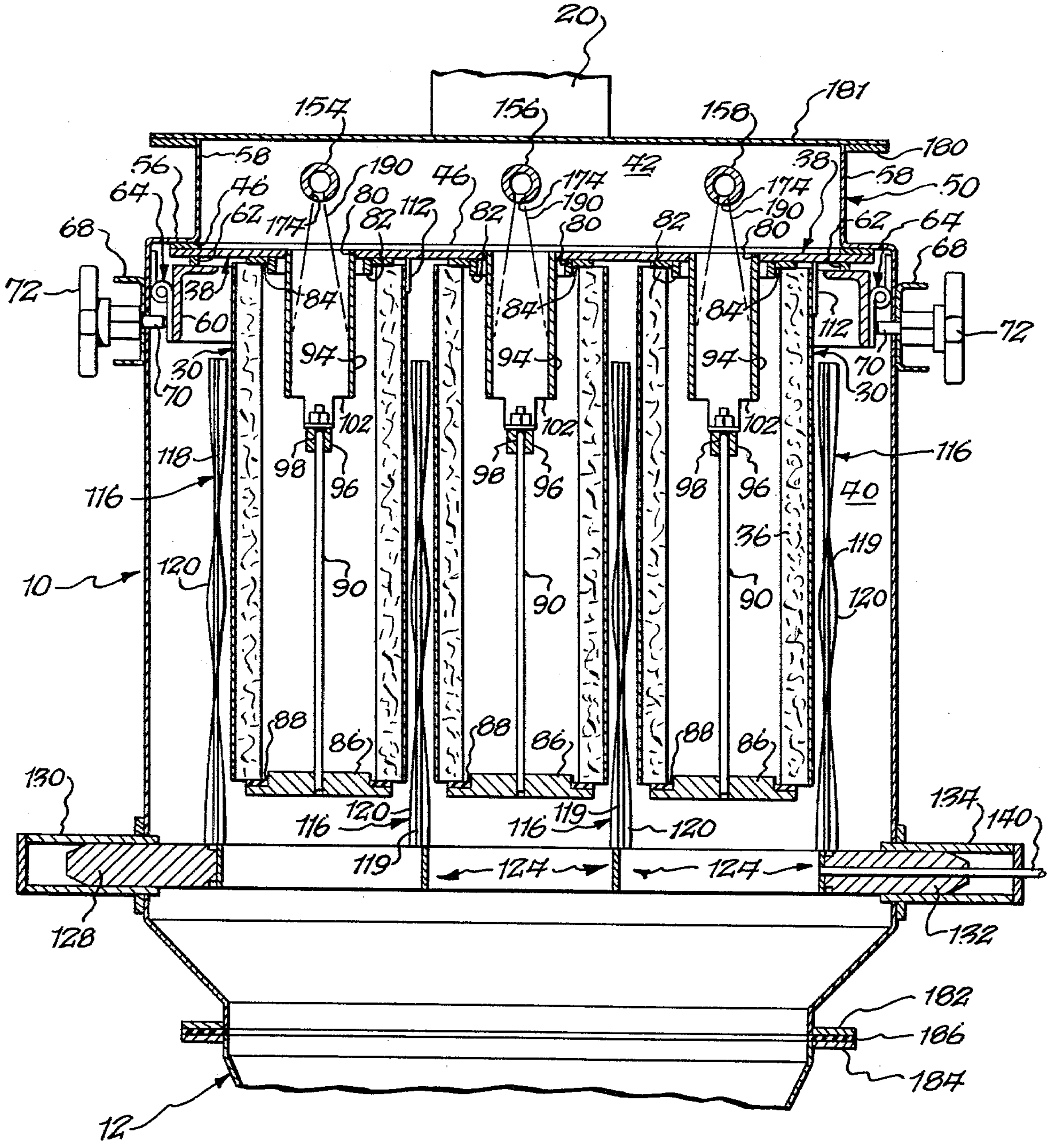
FIG. 3 is a sectional view of the apparatus taken about on line 3—3 of FIG. 2.

The apparatus of the present invention further comprises at least one filter element 30 within the housing, and in the apparatus shown there are a plurality of identical filter elements 30 within the housing main portion 10. Each of the filter elements is elongated and hollow in shape, preferably cylindrical, and is closed at one end and open at the other. Each of the filter elements has a body portion between the ends, and as shown in FIGS. 2 and 3 the body portion comprises an outer shell 32 of electrically conducting material having openings 34 therein permitting passage therethrough of the gas and particulate material. Preferably the shell 32 is a perforated metal cylinder. The filter body portion further comprises an inner filter medium 36 of foraminous dielectric material. In the apparatus shown the filter medium is of paper formed to have successive pleats 37 in a direction circumferentially around the filter longitudinal axis as shown in FIG. 4.

The apparatus further comprises means for holding and positioning the filter elements 30 in the form of a wall or tube sheet 38 disposed horizontally as viewed in FIGS. 2 and 3 in the normal position of use of the apparatus. The wall 38 separates the interior of the housing into a dirty gas region 40 in fluid communication with the housing inlet 16 and a clean gas region 42 in fluid communication with the housing outlet 20. The tube sheet 38 holds and positions the filter elements 30 in the housing in a manner such that gas flows from the interior of the housing through the perforated outer shell 32 and then through the filter medium 36 of each filter element and then axially along and out through the open end of each filter element 30 into the clean gas region 42 and then to the housing outlet 20. Each of the filter elements is connected to the tube sheet 28 adjacent the open ends of the filter elements in a manner such that the open end of each filter element 30 is in communication with the clean gas region 42 and the body of each filter element 30 is in the dirty gas region 40. In addition, filter elements 30 are fixed to tube sheet 38 which, in turn, is releasably held in the housing so that sheet 38 and elements 30 can be removed as a unit from the housing during maintenance in a manner which will be described.

As shown in FIGS. 2 and 3, tube sheet 38 is disposed generally horizontally and is releasably secured to the housing body portion 10 adjacent the upper end thereof in the following manner. A peripheral gasket 46 is located on the upper surface of sheet 38. The housing includes a channel-shaped component 50 as shown in the upper right-hand portion of FIG. 2 adjacent the upper end of housing portion 10 and extending along one of the four walls thereof. The corresponding edge portion of tube sheet 38 and section of gasket 46 are placed against the lower, downwardly facing surface of channel section 50. The assembly is fastened by a plurality of fastening elements in the form of bolt 52 and nut 54. Each of the other three walls of housing portion 10 is provided with an integrally-formed, channel-shaped section at the upper end including a horizontally, inwardly extending portion 56 which meets a vertically disposed portion 58 at substantially a right angle. The corresponding three peripheral edge portions of the tube sheet 38 and the corresponding sections of gasket 46 are held firmly against the downwardly facing surface of portion 56 by the following arrangement. There are three corresponding angle members 60 located adjacent the respective lower peripheral edge portions of tube sheet 38 and inner wall surface of housing portion 10. Each angle member 60 is provided with a spacer 62 on the upper surface of the horizontal leg thereof. Spacer 62 abuts the lower surface of tube sheet 38 as shown in FIGS. 2 and 3 and spacer 62 can extend along the entire axial length of angle member 60 or can comprise a plurality of separate, spaced-apart formations along member 60. The vertically depending leg of member 60 is secured to the inner surface of the housing wall by means of one or more hinge members 64, the leg portions of which are welded or otherwise fixed to the housing wall inner surface and to the outer surface of the vertical member 60.

A limited degree of movement of the upper surface of each angle member 60 and spacers 62 toward and away from tube sheet 38 about the pivot axes of hinges 64 is controlled by a tightening assembly associated with each of the three housing wall portions and including a channel member 68 fixed to the outer wall surface, a shaft 70 extending through the channel member and wall portion with the inner end contacting the vertical leg of angle member 60 and provided with a knob 72 on the outer end located so as to be externally accessible. A number of similar tightening assemblies can be provided. Accordingly, tightening of the arrangement after installation can be provided by turning the knobs 72 in one direction, while loosening can be obtained by opposite rotation thereof when it is desired to remove the tube sheet 38 and cartridges 30. In particular, during installation the knobs 72 are turned to loosen the assemblies and the combination of tube sheet 38, gasket 46 and filter elements 30 fixed to sheet 38 and depending therefrom are moved into position with the tube sheet peripheral edge portions and gasket inserted into the space between the upper surfaces of angle members 60 and the housing portions 56. Shafts 72 are turned to tighten the assemblies causing spacers 62 to bear upwardly against tube sheet 38, and then fasteners 52,54 are installed along the remaining section of the assembly. When it is desired to remove the assembly of tube sheet 38 and filters 30, the double wall section 74 of housing 10 at the righthand side of FIG. 2 is pivoted about a hinge 76 at the lower end thereof to an open position and fasteners 52,54 are removed. The knobs 72 are turned to loosen the assemblies whereupon the combination of tube sheet 38 and filters 30 is easily removed from housing 10.

Each cartridge filter element 30 is vertically disposed when the apparatus is in a normal position of use as shown in FIGS. 2 and 3 with the longitudinal axis of each cartridge 30 being disposed substantially perpendicular to the plane of tube sheet 38. Tube sheet 38 is provided with a plurality of openings 80, one for each filter element 30. The open end of each filter element 30 is adjacent and in fluid communication with the corresponding tube sheet opening 80. A plurality of annular rings 82, each having an inner diameter slightly larger than the diameter of the corresponding opening 80, are welded to the lower surface of tube sheet 38 in concentric relation to the openings 80. Rings 82 serve to guide placement of filters 30 against tube sheet 38 in relation to openings 80. A corresponding plurality of annular gaskets 84 are provided between the axial end faces of cartridges 30 and the lower surface of tube sheet 30 surrounding the openings 80.

Each filter element 30 is urged toward and held against the lower surface of tube sheet 38 by the following arrangement. A generally disc-shaped end cap 86 closes the lower end of each filter element 30. An annular gasket 88 is located in a seat formed in the peripheral portion of cap 86 and contacts the end face of filter 30. Cap 86 and gasket 88 are held firmly against the axial end face of filter 30 and are urged upwardly toward tube sheet 38 by a rod 90 which is fixed at one end in the cap 86. Rod 90 is connected to the tube sheet 38 at the opposite end of rod 90 by the following arrangement. A hollow, flow-directing element in the form of tube 94 is welded at one end to tube sheet 38 along the edge of opening 80. An end member 96 is welded to the other end of tube 94. Member 96 includes a central opening 98 through which the end of rod 90 extends and is connected therein by a washer and nut. Tube 94 is provided with diametrically-opposed openings 102 adjacent the end member 96 for allowing substantially fluid flow therethrough. The foregoing arrangement is provided for each of the filter elements 30 in the apparatus, and in the apparatus shown there are nine filter elements 30.

The apparatus of the present invention further comprises means for providing a zone of corona discharge between the housing inlet 16 and each of the filter elements 30 in a manner such that the gas and particulate matter entering the apparatus through inlet 16 must flow through the zone of corona discharge before passing through the filter elements 30. The corona discharge providing means includes means for connecting each of the outer shells 32 of the filter elements 30 to a reference potential. In particular, as shown in FIG. 3, a high voltage ground connector element 112 is connected to each shell 32 of the filter elements 30 preferably at the upper end thereof. The metal connector 112 element extends both along a small portion of the axial length of each shell 32 and along a portion of the circumference of shell 32. Connector 112 as shown in FIG. 3 also is in contact with tube sheet 38. Each element 112, in turn, can be connected by a separate electrical conductor (not shown) to an electrical ground in a known manner. Alternatively, since each of the connectors 112 is in contact with the metal sheet 38, sheet 38 itself can be connected by a single electrical conductor (not shown) to an electrical ground in a known manner.

The corona discharge providing means further comprises a plurality of electrodes, each generally designated 116, mounted in the housing in spaced, neighboring relation external to each of the filter elements 30. Each of the electrodes 116 has a sharp, corona-producing formation. The electrodes 116 are positioned relative to the filter elements 30 to provide a corona discharge between the sharp edge formations of the electrodes 116 and the corresponding outer shells 32 of the filter elements. The electrodes 116 are elongated and are located between the filter elements 30 and disposed such that the electrode longitudinal axes are substantially parallel to the filter element longitudinal axes. In the apparatus shown, each electrode 116 includes a rod portion 118 and a sharp blade-like edge formation 120 on the outer surface of the rod portion and extending axially along the entire length of the electrode and describing a spiral-like path. A number of electrodes 116 are included in the apparatus, and the particular number and relative locations are such that preferably four electrodes 116 are spaced substantially at 90° intervals outwardly of and around the circumference of each filter element 30.

The corona discharge providing means also includes means for applying a relatively high voltage to the electrodes 116 sufficient to generate corona discharge between the electrode formations 120 and the corresponding filter element shells 32. In particular, the rods 118 are fixed at the lower ends thereof as viewed in FIGS. 2 and 3 to an electrically conductive supporting means which is connected electrically to a suitable potential and which is connected mechanically to housing 10 in a manner electrically insulated from the housing. The supporting means comprises a metal grid structure 124 located in the housing a short distance below the end caps 86 of the filter elements 30. The grid structure 124 is disposed in a plane substantially parallel to the tube sheet 38. Rods 118 are welded to the metal grid 124 in a manner providing an electrically conductive path therebetween, and the grid structure 124 supports the electrodes 116 in a manner such that they are disposed generally vertically as viewed in FIGS. 2 and 3.

The grid structure 124 is connected to the housing by suitable means, and in the apparatus shown this is accomplished simply by outwardly extending connecting elements of electrically insulating material which are fixed to grid structure 124 on two opposite sides of the structure and which are received in the housing walls. In particular, one of the connecting elements is located along the left-hand side as viewed in FIG. 3 and is designated 128. The elongated element 126 is of electrically insulating material, can be of rod or bar shape, is fixed at one end to grid 124, and extends horizontally in an outward direction from grid 124 and through an opening in the housing wall. Element 128 is firmly received and held in a holding element 130 which is hollow in shape, securely fitted in the housing wall opening, and extends outwardly from the wall. Preferably a single connecting structure is employed, but if desired a plurality of such connecting structures comprising the combination of connector 126 and holder 130 can be provided at spaced locations along the left-hand side of grid 124 and along the corresponding housing wall in a direction perpendicular to the plane of the paper as viewed in FIG. 3

A similar connecting arrangement is provided along the opposite side of the grid 124, i.e. along the right-hand side as viewed in FIG. 3. In particular, the elongated connecting element is designated 132 and is rod or bar-shaped, of electrically insulating material, fixed at one end to grid 124, and extends horizontally in an outward direction from grid 124 and through an opening in the housing wall. Element 132 is firmly received and held within a holding element 134 which, like holder 130, is hollow in shape, securely fitted in to the housing wall opening, and extends outwardly from the wall. Preferably a single connecting structure is employed, but if desired a plurality of such connecting structures comprising the combination of connector 132 and holder 134 can be provided at spaced locations along the right-hand side of grid 124 and along the corresponding housing wall in a direction perpendicular to the plane of the paper as viewed in FIG. 3.

One of the structures as shown in FIG. 3 accomodates an electrical conductor for applying high voltage to the grid structure 124 and thus to all of the electrodes 116. In particular, as shown in FIG. 3, the outer end face of holder 134 is provided with an opening and, similarly, the insulator element 132 is provided with a longitudinal bore in substantial alignment with the opening in holder 134. A conductor 140 extends through the opening and along the bore and is connected at the one end thereof to the grid structure 124. The other end of conductor 140 is connected to a suitable supply (not shown) of high direct voltage. The openings in the grid structure 124 together with the spacing between the outer edges of the structure and the interior surface of the housing permits substantially unrestricted flow of the dirty gas from inlet 16 into the region of corona discharge and ultimately to the filter elements 30.

The apparatus of the present invention further comprises cleaning means for introducing a controlled quantity of high pressure gas at predetermined times adjacent the outlets of each of the filter elements 30 and in a direction into the filter elements and counter to the direction of flow of gas during regular operation of the apparatus. The high pressure gas is introduced in a manner including a substantial flow of gas through and along within each of the filter elements 30 from the inlet thereof along the longitudinal axis thereof and then radially outwardly through the filter media 36, through the openings 34 in the outer shell 32, and ultimately toward the apparatus inlet 16. This reverse or counter flow, in turn, serves to remove collected particulate matter from the filter media 34 and from the shells 32 and openings therein in a manner which will be described in further detail presently. The cleaning means comprises a source of compressed gas in the form of a compressed air tank generally designated 150 an conduit means leading from the source 150 and having outlets adjacent the open ends of the filter elements. In particular, tank 150 is fixed to housing 10 by a bracket 152 and a conduit leading from the tank 150 supplies compressed gas to a number of the filter elements. In the apparatus shown, there are a plurality of conduits, in the present example the three conduits 154,156 and 158 leading from tank 150 in spaced, generally parallel relation, and each of the conduits is disposed in spaced relation to three of the filter elements above the tube sheet 38. Each conduit, in turn, includes a control valve therein, for example the three pulsing valves 160, 162 and 164 in the conduits 154,156 and 158, respectively, for controlling the introduction of compressed air to the filter elements. The valves are connected by control lines (not shown) to a control assembly (not shown) which can be carried by the tank and which serves to provide the proper timing relationship for the valves. For a more detailed description of the foregoing arrangement and control thereof, reference may be made to U.S. Pat. No. 4,147,522 issued Apr. 3, 1979 and assigned to the assignee of the present invention, the disclosure of which is hereby incorporated by reference.

The conduits 154,156 and 158 are closed at the opposite ends thereof by suitable means, for example the L-shaped member 170 shown in FIG. 2 which is secured to housing part 50 by another L-shaped member 172. Each of the conduits is provided with a plurality of openings designated 174 in FIGS. 2 and 3, and each opening is located to introduce a jet of compressed gas into a corresponding one of the filter elements 30. Thus, the openings 174 are in the surface of each conduit disposed toward tube sheet 38 and the openings 80 therein, and the openings 174 are in axially spaced relation along the corresponding conduit so as to be located in substantial alignment with the longitudinal axis of the corresponding filter element 30. Thus, compressed gas flowing outwardly downwardly from each opening 174 in a conduit flows into the flow directing element 94 in the manner indicated by the broken lines 190 in FIGS. 2 and 3 and which will be described in further detail presently. The upper part of housing portion 10 terminates in a peripheral flange 180 which is attached in sealing relation to a top wall 181 from which outlet conduit 20 extends. The lower part of housing portion 10 is joined to hopper portion 14 by a structure comprising peripheral flanges 182, 184 and a sealing gasket 186 sandwiched therebetween.

By way of example, in an illustrative apparatus, housing portion 10 is substantially square in cross-section with each side having an overall width of approximately 26 inches, and housing portion 10 has a height of approximately 30 inches measured between flanges 180 and 182. Each of the electrodes 116 has an overall axial length of about 16.5 inches, measured from the upper surface of grid 124, the inner rod portion 118 has a diameter of about 0.25 inch and the spiral portion 120 has an outer diameter of about 0.5 inch. Each of the filter elements 30 has an overall axial length of about 18 inches, an outer diameter measured on shell 32 of about 6 inches, and an inner diameter of about 4 inches measured within the filter medium 36. Each flow directing element 94 has an overall axial length of about 6 inches and an outer diameter of about 2.5 inches. Filters 30 can be in the form of cartridge filter elements commercially available from Facet Corporation under the designation Series M Filter Cartridges model C-736. The entire apparatus desirably is of small size, occupying a volume of around 2 cubic feet, and has the capability of handling flows of about 1,000 cubic feet per minute.

The apparatus of the present invention operates in the following manner. Dirty gas is introduced to the apparatus through inlet conduit 16 and is moved by operation of fan 22 first through the corona discharge provided between electrodes 116 and the outer shells 32 of the filter elements 30, and then through the filters 30 in a direction from the outside through the shells 32, through the filter media 36, through the interiors of the filters 30. As a result a portion of the particulate matter is collected on the shells 32 of the filters 30 and the remainder of the particulate matter is collected in the filter media. Then cleaned gas is withdrawn from the filter elements 30 and flows out through conduits 20 and 24 from the apparatus. In particular, the gas to be cleaned flows from duct 16 upwardly through hopper portion 12 through and around the grid 124 and then through the region containing electrodes 116 in a direction toward the outer shells 32 of the filter elements. Each electrode is maintained at a negative potential with respect to the shells 32 of the filter elements, and the shells are maintained at a zero or reference ground potential. In a dust collector having the dimensions according to the example hereinabove, the potential difference would be about 20,000 volts.

Dust particles and other particulate matter are charged in the region of the corona discharge and a portion of the charged particles are collected on the outer surfaces of the shells 32 of the filter elements. The gas is moved by fan 22 through the shells 32 and then through the filter media 36 where the remainder of the particulate matter is collected. The pleated paper filter medium increases the filtering area per volume. Then the clean gas is withdrawn from the filters 30 by fan 22, the gas flowing axially out of the filters upwardly through the conduit 20 and ultimately leaving the apparatus through outlet duct 24. While gas is moved through the apparatus by a fan connected to the outlet 20 which serves to draw gas through the apparatus in the present illustration, the gas could be moved by a fan connected to inlet 16 which would force or propel gas through the apparatus.

In the method and apparatus of the present invention, with the metal electrodes 116 being evenly distributed between the filter elements 30 and having a high voltage a applied thereto, the perforated metal outer skins or shells 32 of the filter elements being at ground potential serve as corona discharge anodes. The corona discharge occurs on the sharp edges of the formations 120 on electrodes 116. The incoming air flow must pass through this zone of corona discharge before passing through the filtering elements, and in this way the particles are charged. Having the particles so charged advantageously allows operation of the apparatus to achieve desired collection efficiency with a lower pressure drop through the apparatus. Another advantage is that the collection efficiency itself is enhanced. In this connection, the apparatus of the present invention has the capability of collecting any dry particles having a size of about microns in diameter or less.

The arrangement of the electrodes 116 being located radially outwardly of the filter elements 30 and extending axially along a major portion of the elements 30 serves to increase the amount of corona generation. In addition, the entire arrangement of electrodes 116 advantageously is supported at the bottom thereof by the grid structure 124, which also serves as a means to apply voltage to the electrodes. This has the added advantage of providing a self-supporting structure which can be connected mechanically in the apparatus by merely one insulator element on each of the two sides of the structure 124. This is in contrast to an arrangement where each corona discharge electrode would be in the form of a wire which, because it is not self-supporting, has to be supported separately at opposite ends and also separately insulated.

Periodically, the deposited particulate material is cleaned from the outer filter shells 32 and from the filter media 36 of the cartridges 30 by means of a reverse flow induced by a short burst of compressed air emanating from the conduits 154, 156 and 158. This jet of primary air causes or induces a secondary air flow, and this secondary flow of air, in a direction reverse with respect to the direction of filtering, is through the filter media 36 and through the shells 32 and dislodges the accumulated particulate material on both elements. In particular, the reverse flow forces the particulate matter out from the filter medium 36 and through the openings 34 in shell 32 of each filter element 30. There may be some abrupt flexing of the filter medium also. The flow of air also dislodges collected dust from the outer surface of the shell 32. The dislodged particles from all of the filter elements fall down and around and through grid 124 and into the hopper region 12 to a suitable collector. The force of the induced flow of air in the direction described enhances the foregoing and also serves to dislodge any other particulate matter from other surfaces of the apparatus. Introducing the jet of air or other gas in this manner provides a pump-like or fan-like effect cleaning the filter media 36 and surfaces of the shells 32.

In a typical installation including a plurality of filter elements 30 each element is cleaned once every few minutes, for example about once every four minutes. The air pressure employed is generally in the range from about 60 psig. to about 80 psig., and the jet or pulse of air or gas from the conduits 154,156 and 158 typically has a duration of about 1 second and a magnitude of about 1.5 standard cubic feet of ar. The full cleaning cycle for each filter element 30 is accomplished in about one second. Three filter elements at a time can be cleaned, in particular first the three filter elements associated with conduit 154, then the three associated with conduit 156 followed by the three associated with conduit 159. Flow of compressed gas to the conduits is of course controlled in a timed relation by the valves 160,162 and 164. In such an installation, only a small fraction of the total number of filter elements 30 is cleaned at one time, and therefore the operation of the installation is not interrupted for cleaning. In other words, there is no need to provide any isolation for the filter elements 30 or groups thereof.

In each of the filter elements 30, the flow directing tube or conduit 94 serves as a jet pump. The flow of compressed gas from the conduits 154, 156, 158 is directed by each tube 94 substantially axially of the corresponding filter element. This, in turn, induces the reverse air flow which when within the filter elements 30 then flows radially outwardly through the filter media 36 and the shells 32. In other words, it is the primarily induced reverse flow which travels through the medium 36 and the shell 32 of each filter element 30, not the merely jet or pulse of compressed gas from the conduits. Providing the flow directing conduit 94 entirely within the cartridges 30 serves to prevent undesirable wear on the filter medium 36 which otherwise would be subjected to the compressed gas flow. In addition, putting the flow directing elements within the filters serves to save space.

It is therefore apparent that the present invention accomplishes its intended objects. While an embodiment of the present invention has been described in detail, this is for the purpose of illustration, not limitation.

We claim:

1. Apparatus for separating particulate matter from a gas stream comprising:

(a) a housing having an inlet for receiving dirty gas and an outlet;

(b) a plurality of filter elements in said housing, each of said filter elements being elongated and hollow, closed at one end and open at the other, each of said filter elements having a body portion between said ends, said body portion comprising an outer shell of electrically conducting material having openings therein permitting passage therethrough of said gas and particulate material and an inner filter medium of foraminous dielectric material;

(c) means for holding and positioning said filter elements in spaced relation in said housing with said outer shell and said filter medium being in fluid communication with said housing inlet and with said open end of said filter element being in fluid communication with said housing outlet so as to allow the flow of gas from the interior of said housing through said outer shell and then through said filter medium of each of said filter elements and then axially within and out through said open end of each of said filter elements into said housing outlet; and (d) means for providing a zone of corona discharge at a location in the path of gas flow between said housing inlet and each of said filter elements so as to cause said gas and particulate mater to flow through said zone prior to passing through said filter elements.

2. Apparatus according to claim 1, wherein said corona discharge providing means comprises:

(a) means for connecting each of said outer shells of said filter elements to a reference potential;

(b) a plurality of electrodes each having a sharp edge formation, said electrodes being positioned relative to said filter elements to provide a corona discharge between said sharp edge formations of said electrodes and corresponding shells of said filter elements; and (c) means for applying a relatively high voltage to said electrodes sufficient to generate corona discharge between said electrode formations and corresponding filter element shells.

3. Apparatus according to claim 2, wherein the longitudinal axes of said filter elements are in substantially parallel relation and said electrodes are elongated, located between said filter elements and disposed such that the electrode longitudinal axes are substantially parallel to the filter element longitudinal axes.

4. Apparatus according to claim 3, wherein each of said electrodes comprises a rod and wherein said electrode sharp edge formation comprises a sharp-edged, foil-like ribbon element attached to said rod and extending axially along said rod.

5. Apparatuas according to claim 4, wherein said ribbon element defines a spiral-like path along said rod.

6. Apparatus according to claim 1, wherein said means for holding and positioning said filter elements comprises a wall in said housing separating the interior of said housing into a dirty gas region in communication with said housing inlet and a clean gas region in communication with said housing outlet, said filter elements being connected to said wall adjacent the open ends of said filter elements in a manner such that the open end of each of said filter elements is in communication with the clean gas region and the body of each of said filter elements is in the dirty gas region.

7. Apparatus according to claim 6, further including:

(a) a hollow elongated flow directing element in each of said filter elements and having one open end fixed to said wall adjacent the open end of said filter element and extending into and terminating in an open end within said filter element;

(b) a closure element in each of said filter elements for closing the opposite end of said filter element; and (c) an elongated connector element in each of said filter elements connected at one end to said closure element and at the opposite end to said flow directing element whereby each filter element is held firmly in place with one end against said wall.

8. Apparatus according to claim 6, further including means for releasably holding said wall in said housing whereby said wall and filter elements can be removed from said housing as a unit.

9. Apparatus according to claim 1, wherein said filter medium is paper.

10. Apparatus according to claims 1 or 9 wherein said filter medium is formed to have successive pleats in a direction circumferentially around the filter longitudinal axis.

11. Apparatus according to claim 1 further including cleaning means for introducing a controlled quantity of high pressure gas at selected times adjacent said open ends of said filter elements and in a direction into said filter elements to remove collected particulate matter from said filter elements.

12. Apparatus according to claim 11, wherein said cleaning means comprises:

(a) a source of compressed gas; and (b) conduit means leading from said source and having an outlet adjacent said open ends of said filter elements.

13. Apparatus according to claim 12, further including flow directing means operatively associated with each of said filter elements at the open ends thereof for directing the flow of said compressed gas generally centrally and longitudinally of each of said filter elements.

14. Apparatus according to claim 13, wherein said flow directing means comprises a hollow directing element having one open end adjacent the open end of said filter element and an opposite open end within said filter element, said directing element and filter element being substantially coaxial.

15. Apparatus according to claim 14, wherein said flow directing element comprises a tube impervious to gas flow having an outer diameter less than the inner diameter of said filter medium and having an axial length extending along a minor portion of the axial length of said filter element.

16. Apparatus for separating particulate matter from a gas stream comprising:

(a) a housing having an inlet for receiving dirty gas and an outlet;

(b) a wall in said housing dividing the interior of said housing into a dirty gas chamber in communication with said inlet and a clean gas chamber in communication with said outlet;

(c) a plurality of filter elements each being hollow elongated in shape open at one end and closed at the other and having a body between said ends comprising an outer shell of electrically conducting material having openings therein permitting passage therethrough of said gas and particulate material and an inner filter medium of foraminous dielectric material, each of said filter elements being connected to said wall adjacent said open end thereof in a manner such that said open end is in communication with said clean gas chamber and said body is in said dirty gas chamber whereby dirty gas flows from said dirty gas chamber through said outer shell and through said filter medium then out said open end into said clean gas chamber;

(d) a plurality of discharge electrodes mounted in said housing in spaced, neighboring relation external to said filter elements, each of said electrodes having a sharp corona producing formation; and (e) means for applying an electrical potential difference between said electrodes and said shells of said filter elements of sufficient magnitude to generate a corona discharge between said electrodes and said shells;

(f) whereby as dirty gas flows from said housing inlet through said filters the particulate matter is electrostatically charged before entering said filter medium and a portion of said particulate matter is collected on said shell and the remainder is collected in said filter medium.

17. Apparatus according to claim 16, wherein the longitudinal axes of said filter elements are in substantially parallel relation and said electrodes are elongated, located between said filter elements and disposed such that the electrode longitudinal axes are substantially parallel to the filter element longitudinal axes.

18. Apparatus according to claim 17, wherein each of said electrodes comprises a rod having attached thereto a sharp edged, foil-like ribbon element extending axially along said rod.

19. Apparatus according to claim 16 further including cleaning means for introducing a controlled quantity of high pressure gas at selected times adjacent said open ends of said filter elements and in a direction into said filter elements to remove collected particulate matter from said filter elements.

20. Apparatus according to claim 19, wherein said cleaning means comprises:

(a) a source of compressed gas; and (b) conduit means leading from said source and having an outlet adjacent said open ends of said filter elements.

21. Apparatus according to claim 20, further including flow directing means operatively associated with each of said filter elements at the open ends thereof for directing the flow of said compressed gas generally centrally and longitudinally of each of said filter elements.

22. Apparatus according to claim 21, wherein said flow directing means comprises a hollow direction element having one end adjacent the open end of said filter element and an opposite open end within said filter element, said directing element and filter element being substantially coaxial.

23. In a cartridge type filter comprising a hollow, elongated filter element closed at one end by a closure elements and open at the other having a perforated outer shell of rigid material and an inner filter medium of foraminous dielectric material and adapted to be included in apparatus for removing particulate matter from a gas stream such that dirty gas moves into said filter element through said shell and said filter medium and cleaned gas exits from said filter open end and periodically a pulse of compressed gas is introduced into said filter open end for causing a reverse flow of gas through said filter to clean said filter medium and said shell, the improvement comprising:

a hollow elongated flow directing element of material impervious to flow of gas and located entirely within said hollow filter element, said flow directing element having an opening at one end adjacent to said open end of said filter element and having openings at the opposite end located between said ends of said filter element, said flow directing element having an internal cross-sectional area of substantially constant size along the entire length of said directing element, said flow directing element acting as a jet pump to induct a substantial reverse flow of gas through said filter element for cleaning same, said flow directing element having a member fixed to said opposite end and extending across said opposite end, said openings in said flow directing element being located adjacent said end member and being of a size allowing substantial fluid flow therethrough, and an elongated connecting element in said filter element connected at one end to said closure element and connected at the opposite end to said end member of said flow directing element for holding said closure element in place.

24. Apparatus according to claim 23, wherein said filter element is substantially cylindrical and wherein said flow directing element is in the form of a tube having an outer diameter less than the inner diameter of said filter medium and an axial length extending along a minor portion of the axial length of said filter element.

25. Apparatus for separating particulate matter from a gas stream comprising (a) a housing having an inlet for receiving dirty gas and an outlet;

(b) at least one filter element within said housing, said at least one filter element being substantially cylindrical, closed at one end and open at the other, said at least one filter element comprising a metal outer shell having openings therein permitting passage therethrough to said gas and particulate matter and an inner filter medium of foraminous dielectric material;

(c) means for holding and positioning said at least one filter element in said housing in a manner such that gas flows from the interior of said housing through said outer shell and then through said filter medium of said at least one filter element and then axially within and out through said open end of said at least one filter element into said housing outlet;

(d) a plurality of corona discharge electrodes spaced radially outwardly of and circumferentially around said at least one filter element, each of said electrodes being in the form of a rod and disposed such that the longitudinal axis of said electrode is substantially parallel to the longitudinal axis of said at least one filter element, each of said electrodes having a sharp-edged corona producing formation extending along the outer surface thereof in a generally axial direction and;

(e) means for applying an electrical potential difference between said electrodes and said shell of said at least one filter element of sufficient magnitude to generate a corona discharge between said electrodes and said shell;

(f) whereby as dirty gas flows from said housing inlet through said at least one filter element the particulate matter is electrostatically charged before entering said filter medium and a portion of said particulate matter is collected on said shell and the remainder is collected in said filter medium.

26. Apparatus according to claim 25, wherein said corona-producing formation comprises a sharp-edged, foil-like ribbon element attached to the outer surface of said electrode and extending generally axially therealong.

27. Apparatus according to claim 26, wherein said ribbon element defines a spiral-like path along said electrode.

28. Apparatus according to claim 25, wherein said filter medium is of paper.

29. Apparatus according to claim 25, wherein four of said electrodes are spaced substantially at ninety degree intervals around the circumference of said at least one filter element.

30. Apparatus according to claim 25, further including cleaning means for introducing a controlled quantity of high pressure gas at selected times adjacent said open end of said at least one filter element and in a direction into said at least one filter element to remove collected particulate matter from said at least one filter element.

31. Apparatus according to claim 30, wherein said cleaning means comprises:

(a) a source of compressed gas; and (b) conduit means leading from said source and having an outlet adjacent said open end of said at least one filter element.

32. Apparatus according to claim 31, further including flow directing means operatively associated with said at least one filter element at the open end thereof for directing the flow of said compressed gas.

33. Apparatus according to claim 32, wherein said flow directing means comprises a hollow directing element having one open end coincident with the open end of said at least one filter element and an opposite open end within said at least one filter element, said directing element and said at least one filter element being substantially coaxial.

34. A method of separating particulate matter from a gas stream utilizing a filter comprising an elongated, hollow element closed at one end and open at the other and having a body between said ends comprising an outer shell of electrically conducting material having openings therein permitting passage therethrough of said gas and particulate material and an inner filter medium of foraminous dielectric material, comprising the steps of:

(a) providing a corona discharge between corona electrodes and the outer shell of said filter;

(b) moving dirty gas first through said corona discharge and then through said filter in a direction from the outside through said shell, through said filter medium and through the interior of said filter;

(c) collecting a portion of the particulate matter on said shell of said filter;

(d) collecting the remainder of the particulate matter in said filter medium; and (e) withdrawing clean gas from said filter.

35. A method according to claim 34, further including introducing a controlled quantity of high pressure gas at predetermined times adjacent the open end of said filter and in a direction so as to induce a substantial flow of gas from said gas stream in a direction through said filter from the interior thereof through said filter medium and through said shell to remove collected particulate matter from said filter medium and from said shell.

* * * * *

UNITED STATES PATENT AND TRADEMARK OFFICE

CERTIFICATE OF CORRECTION

PATENT NO. : 4,357,151

DATED : November 2, 1982

INVENTOR(S) : Dennis J. Helfritch and Edward J. Gonas

It is certified that error appears in the above-identified patent and that said Letters Patent are hereby corrected as shown below:

Claim 23, line 3, "elements" should be --element--.

Claim 23, line 24, "induct" should be --induce--.

Signed and Sealed this

*Eighth* Day of *February 1983*

[SEAL]

*Attest:*

GERALD J. MOSSINGHOFF

*Attesting Officer* *Commissioner of Patents and Trademarks*